(12) United States Patent
Wang et al.

(10) Patent No.: US 11,336,739 B1
(45) Date of Patent: May 17, 2022

(54) INTENT-BASED ALLOCATION OF DATABASE CONNECTIONS

(71) Applicant: Salesforce.com, Inc., San Francisco, CA (US)

(72) Inventors: Xiaodan Wang, Dublin, CA (US); Paul Sydell, San Rafael, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 17/132,272

(22) Filed: Dec. 23, 2020

(51) Int. Cl.
| | | |
|---|---|---|
| H04L 12/00 | (2006.01) | |
| H04L 67/562 | (2022.01) | |
| G06F 16/27 | (2019.01) | |
| G06F 16/245 | (2019.01) | |
| G06F 9/50 | (2006.01) | |

(52) U.S. Cl.
CPC ........ *H04L 67/2809* (2013.01); *G06F 9/5083* (2013.01); *G06F 16/245* (2019.01); *G06F 16/27* (2019.01)

(58) Field of Classification Search
CPC . H04L 67/2809; G06F 9/5083; G06F 16/245; G06F 16/27
USPC ................................................. 709/223, 226
See application file for complete search history.

(56) References Cited

U.S. PATENT DOCUMENTS

| | | | |
|---|---|---|---|
| 7,937,491 B1 * | 5/2011 | Ng ........................ | G06F 16/252 709/238 |
| 9,268,605 B2 | 2/2016 | Wang et al. | |
| 9,348,648 B2 | 5/2016 | Wang et al. | |
| 9,529,626 B2 | 12/2016 | Wang et al. | |
| 9,632,852 B2 | 4/2017 | Kwong et al. | |
| 9,766,960 B2 | 9/2017 | Wang | |
| 9,813,516 B2 | 11/2017 | Wang | |
| 9,858,187 B2 | 1/2018 | Sundaravaradan et al. | |
| 9,984,002 B2 | 5/2018 | Sundaravaradan et al. | |
| 9,990,400 B2 | 6/2018 | Sundaravaradan et al. | |
| 10,013,294 B2 | 7/2018 | Kwong et al. | |
| 10,013,501 B2 | 7/2018 | Sundaravaradan et al. | |
| 10,140,153 B2 | 11/2018 | Wang | |
| 10,169,090 B2 | 1/2019 | Wang | |
| 10,637,949 B2 | 4/2020 | Wang | |
| 10,664,266 B2 | 5/2020 | Peschansky et al. | |
| 10,693,709 B2 | 6/2020 | Chainani et al. | |
| 10,768,983 B2 | 9/2020 | Wang et al. | |
| 10,776,147 B2 | 9/2020 | Ovesea et al. | |
| 10,776,373 B2 | 9/2020 | Wang | |
| 10,817,497 B2 | 10/2020 | Zaslavsky et al. | |

(Continued)

FOREIGN PATENT DOCUMENTS

CA        2883883 C        9/2019

Primary Examiner — Frantz Coby
(74) Attorney, Agent, or Firm — Kwan & Olynick LLP (57) ABSTRACT

Messages are transmitted to first and second server groups in an on-demand computing services environment. The first message instructs the first server group to reduce a first resource allocation level associated with a network-accessible computing resource, while the second message instructs the second server group to increase a second resource allocation level associated with the resource. The resource allocation levels designate respective proportions of the network-accessible computing resource shared among the server groups. Request traffic associated with providing services via the on-demand computing services environment is transferred from the first server group to the second server group after decreasing the first resource allocation level and increasing the second resource allocation level.

20 Claims, 8 Drawing Sheets

(56) References Cited

U.S. PATENT DOCUMENTS

| | | | |
|---|---|---|---|
| 2003/0236822 A1* | 12/2003 | Graupner | G06F 9/5066 |
| | | | 709/203 |
| 2005/0063411 A1* | 3/2005 | Wang | H04L 12/4608 |
| | | | 370/437 |
| 2005/0229219 A1* | 10/2005 | Rosabella | H04M 15/68 |
| | | | 725/87 |
| 2008/0082555 A1* | 4/2008 | Salmon | H04L 67/1097 |
| 2010/0017514 A1* | 1/2010 | Wagh | H04L 67/1002 |
| | | | 709/226 |
| 2011/0145902 A1* | 6/2011 | Kim | H04N 21/64322 |
| | | | 726/7 |
| 2012/0311022 A1* | 12/2012 | Watanabe | G06F 11/0757 |
| | | | 709/203 |
| 2014/0018037 A1* | 1/2014 | Shanmugavadivel | |
| | | | H04W 48/18 |
| | | | 455/411 |
| 2014/0075017 A1 | 3/2014 | Wang et al. | |
| 2015/0046279 A1 | 2/2015 | Wang | |
| 2016/0119244 A1 | 4/2016 | Wang et al. | |
| 2016/0119246 A1 | 4/2016 | Wang | |
| 2017/0111187 A1* | 4/2017 | Zanier | H04L 12/4641 |
| 2017/0116566 A1* | 4/2017 | Walton | G06Q 30/0283 |
| 2018/0063271 A1 | 3/2018 | Wang | |
| 2018/0349931 A1* | 12/2018 | Chen | G06Q 10/04 |
| 2019/0095249 A1 | 3/2019 | Wang | |
| 2019/0235895 A1 | 8/2019 | Ovesea et al. | |
| 2019/0235918 A1 | 8/2019 | Liu et al. | |
| 2019/0236150 A1 | 8/2019 | Zaslavsky et al. | |
| 2019/0236201 A1 | 8/2019 | Wang et al. | |
| 2019/0268283 A1* | 8/2019 | Mukherjee | H04L 47/746 |
| 2019/0306008 A1 | 10/2019 | Chainani et al. | |
| 2020/0249932 A1 | 8/2020 | Peschansky et al. | |

\* cited by examiner

INTENT-BASED ALLOCATION OF DATABASE CONNECTIONS

FIELD OF TECHNOLOGY

This patent document relates generally to cloud computing systems and more specifically to shared resources such as database connections.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Resources in a cloud computing system are often shared among different computing devices and applications. For example, cloud computing applications being executed on computing devices arranged in a group or pod may be configured to share a number of active connections to a shared database. Shared resources can play a prominent role in cloud computing cost and performance. On the one hand, overprovisioning shared resources can increase expense due to maintaining excess capacity. On the other hand, under provisioning shared resources can result in underperformance as applications and devices compete for scarce resources.

BRIEF DESCRIPTION OF THE DRAWINGS

The included drawings are for illustrative purposes and serve only to provide examples of possible structures and operations for the disclosed inventive systems, apparatus, methods and computer program products for allocating shared resource. These drawings in no way limit any changes in form and detail that may be made by one skilled in the art without departing from the spirit and scope of the disclosed implementations.

DETAILED DESCRIPTION

Techniques and mechanisms described herein relate to the allocation of finite and shared resources within an on-demand computing services environment. An on-demand computing services environment includes one or more computing systems configured to provide computing services via the internet. In many such systems, computing services are provided by application hosts, which are computing servers configured to execute various cloud computing applications.

In some implementations, computing servers share resources within a cloud computing environment. For example, cloud computing applications being executed on servers arranged in a group (also referred to herein as a "pod") may be configured to share a number of active connections to a shared database. Many of the shared resources held by application hosts are finite. For example, a database system may be capable of supporting only a designated number of database connections. On the other hand, many pods are configured to operate at close to maximum capacity of the shared resource, to avoid the expense associated with overprovisioning, and thereby cannot tolerate a large drop in available resources without adversely impacting or failing customer requests. For these reasons, shared resources can play a prominent role in cloud computing cost and performance.

Resource allocation may prove particularly difficult at points of transition, such as during release events when application hosts are patched or upgraded from an older version to a newer version. One approach to a release event is to first activate a new group of computing servers that feature one or more hardware changes or software releases. Application traffic may then be transitioned from an existing, out-of-date group of computing servers to the new group of computing servers. During releases, it is important to ensure traffic continuity; there should be minimal to no disruption to customer requests as application hosts are upgraded. However, because only a finite amount of the shared resource exists, the resource must be allocated between the two groups of computing servers. Thus, a key to providing this guarantee is ensuring that resources are allocated to the right group of application hosts so that the system can sustainably serve the same volume of customer requests before, during, and after the release.

Consider, for instance, the example of allocating database connections between an old and new group of application hosts. Suppose for the purpose of illustration that the database system can support a maximum of 1,000 concurrent database connections, and that database connections are created automatically based on current traffic load. Suppose further that 990 of the concurrent database connections are currently held by the old group of application hosts, while 10 concurrent database connections are held by the new group of application hosts because they were automatically created in response to initial test traffic. If all incoming customer requests were suddenly routed to the new application hosts, in accordance with conventional techniques, then the new hosts would be unable to sustain these requests because the arrival rate of customer requests would exceed the rate at which database connections could be created. This bottleneck, which may be referred to as a "connection exhaustion incident," would create a significant performance reduction in responding to the request traffic, which may manifest as delay and/or failure in request response.

Complicating matters further, in some instances traffic needs to be rolled back from the new application hosts to the old application hosts, for instance if a problem with a product release is detected. However, when using conventional techniques, in such a situation the old application hosts may have access to none of the shared resource (e.g., database connections) since those resources were released from the old application hosts after traffic was transferred. Thus, if a rollback were required, then under conventional techniques additional request response delays and/or failures may be created due to the old application hosts lacking the shared resources necessary for responding to the volume of request traffic.

Techniques and mechanisms described herein provide for improved allocation of finite and shared resources. In some implementations, such techniques and mechanisms may be particularly beneficial when transitioning traffic between groups of computing servers to ensure traffic continuity, for instance during release events. That is, techniques and mechanisms described herein may reduce or eliminate disruption to customer requests as request traffic is transitioned between groups of computing devices. In particular, resources may be effectively and efficiently allocated between groups of application hosts so that the system can sustainably serve the same volume of customer requests before, during, and after the transition event.

According to various embodiments, transition intent may be surfaced from an underlying process, such as a release orchestration process, which may allow for improved allocation decisions and reduced or eliminated disruption to customers. For instance, traffic intent for a group of computing devices may be classified into phases such as "live", "warm up", "idle", and "draining." Allocation decisions may also be tuned at a granular level. Using such tools, factors such as the proportion of resources allocated during a transition event as well as the speed at which reallocations take affect may be adjusted.

According to various embodiments, some techniques and mechanisms are described herein with respect to a shared pool of connections to a database system, for the purpose of illustration. However the techniques and mechanisms described herein are broadly applicable to a wide range of constrained, shared resources. For instance, techniques and mechanisms described herein apply equally well to resources such as connections to message queue brokers, file servers, distributed coordination services (e.g., Zookeeper), or other such systems within a computing services environment.

According to various embodiments, techniques and mechanisms described herein may facilitate intent-based allocation of constrained and shared resources. Intent-based allocation can take into account information such as the current status or phase of a server or server group, one or more configured distribution targets, and/or a configured ramp up rate in order to make resource allocation decisions before, during, and after a request traffic transfer event.

By way of illustration, considered the following concrete example. Suppose that Alexandra, a systems administrator, would like to upgrade a group of application servers. Using conventional techniques, she could deactivate the servers, perform the upgrade, and then reactivate the servers. However, such an approach would leave the servers offline for a lengthy and indeterminate period of time, which would violate service level agreements with customers. Using conventional techniques, she could instead activate a new group of updated application servers, and then suddenly switch all traffic to the new group of updated application servers. However, the new group of updated application servers would not have any active database connections or other shared resources because prior to the switch the new group of updated application servers would not be handling any request traffic. Thus, the new group of updated application servers would not be able to handle the surge in request traffic until the shared resources were slowly released by the old group of application servers and then slowly acquired by the new group of updated application servers. Both approaches would result in a considerable disruption to the services provided by the application servers, the first because the servers were disabled completely and the section from the connection exhaustion that occurs during the transfer between the two server groups.

Suppose instead that in this example Alexandra employed techniques and mechanisms as described herein. For the purpose of illustration, this example focuses on a single shared resource: connections to a shared database. However, as discussed herein, a variety of shared resources may be managed using techniques and mechanisms described herein. For the purposes of this example, assume that the database system is shared among the application servers and can sustain a maximum of 1,000 concurrent, open database connections. Also assume that the rate at which connections ramp up or down is 100 per minute. That is, 100 connections can be re-allocated from one application group to another within a minute.

In this example, prior to the release event, only the old application group is serving customer traffic. As such, all of the available database connections are allocated to the old application group at that time.

At the start of the release the new application group is brought up in the idle phase. Customer requests continue to be routed to the old application group. However, database connections start to be reallocated to the new application group, despite it not yet taking any traffic. In this example, 10% or 100 connections are re-allocated from the old to the new application group. This allocation takes around 1 minute after the new application servers are activated.

At this point, the new application servers may be tested. Once testing on the new application group is complete, the new servers are placed in a warm up phase in preparation for the switch over. This shift to a warm up phase triggers the allocation of additional database connections from the old to the new application group. In this example, an additional 20% of the total connections are re-allocated to the new application group, which takes around 2 minutes to complete.

Once customer traffic is switched over, the new application group enters the live phase while the old application group enters the draining phase. At this time, both application groups are serving customer traffic; incoming customer requests are routed to the new group while existing requests run to completion on the old group. It can take a period of time (e.g., several minutes) for existing requests to drain on the old group but once a request completes, the corresponding database connection is closed and re-allocated to the live group. In this example, it may take around 6 minutes to re-allocate an additional 600 connections to the new application group.

Once the release is complete, the old application group can be kept around in the idle phase in case rollback is required. For example, a 10% vs 90% distribution of database connections between old and new application groups may be maintained.

In the preceding example, Alexandra can transfer request traffic from the old application group to the new application group without resulting in the service disruption that is caused by connection exhaustion. This is because database connections may be at least partially overprovisioned (e.g., by 10%), to ensure service continuity in the event of normal ebbs and flows in request traffic over time. As long as the transfer event occurs at a time when request traffic is relatively low, then the slight overprovisioning can be used as a buffer in combination with intent-based resource reallocation to provide for a smooth transfer of request traffic between the two server groups.

Techniques and mechanisms related to connection pools are also discussed in co-pending and commonly assigned U.S. patent application Ser. No. 16/579,729 by Obembe et al., which is hereby incorporated in its entirety and for all purposes.

Figure 1:
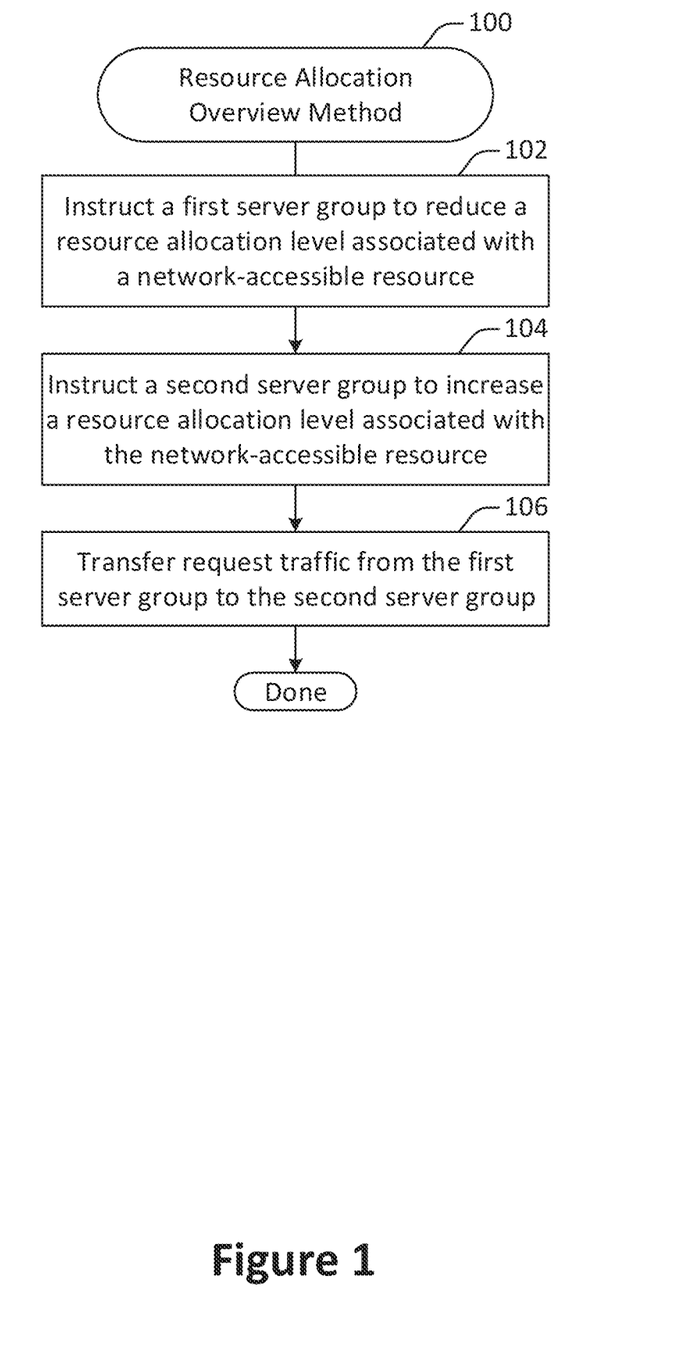
FIG. 1 illustrates an example of an overview method for resource allocation, performed in accordance with one or more embodiments.

FIG. 1 illustrates an example of an overview method 100 for resource allocation, performed in accordance with one or more embodiments. The method 100 may be performed at a computing services environment configured to provide computing services to clients via the internet. The method 100 may be performed when transitioning request traffic associated with the computing services environment from a first server group to a second server group.

A first server group is instructed at 102 to reduce a resource allocation level associated with a network-accessible resource. The instruction may be sent by a centralized control entity such as a systems orchestrator. In response to the instruction, the first server group may reduce the level of resources allocated to the network-accessible resource. For instance, the first server group may reduce the number of active connections to a shared database system.

A second server group is instructed at 104 to increase a resource allocation level associated with the network-accessible resource. As with operation 102, the instruction may be sent by a centralized control entity such as a systems orchestrator. In response to the instruction, the second server group may increase the level of resources allocated to the network-accessible resource. For instance, the second server group may increase the number of active connections to a shared database system.

Request traffic may be transferred from the first server group to the second server group at 106. In some implementations, the traffic may be transferred by a load balancer configured to receive request traffic from remote machines via the internet and route the request traffic to the appropriate server group.

FIG. 2A, FIG. 2B, FIG. 2C, FIG. 3A, FIG. 3B, and FIG. 3C illustrate system 200 configured in accordance with one or more embodiments. The system 200 is an on-demand computing services system configured to provide computing services to remote machines via the internet. The system 200 includes a server pod A 202, a server pod B 212, a load balancer 222, an orchestrator 224, and a database instance 226. The server pod A 202 includes application servers 204, 206, and 208, while the server pod B includes the application servers 214, 216, 218.

According to various embodiments, the load balancer 222 is configured to receive requests for computing services and to route those requests to a server pod. Each computing pod is configured to respond to computing services requests by executing the requests via applications implemented on application servers. Executing a request may involve accessing data in a database instance, transmitting a message via a messaging service, updating configuration information, generate a user interface, and/or any of a variety of operations capable of being performed by the on-demand computing services environment. For instance, executing the request may include accessing the database instance 226.

According to various embodiments, the orchestrator 224 may manage various configuration information association with the pods. For example, the orchestrator 224 may instruct each pod as to a resource allocation level associated with a shared resource, such as a number of database connections to the database instance 226, As another example, the orchestrator 224 may instruct the load balancer 222 as to the proportion of request traffic to send to various pods.

In this way, the orchestrator may perform operations such as switching active traffic from one pod to another pod. Each of FIG. 2A, FIG. 2B, FIG. 2C, FIG. 3A, FIG. 3B, and FIG. 3C illustrates system 200 in a particular state, which may be associated with such a transfer procedure. Although these states are only examples of possible states that may be associated with individual computing devices or groups of application servers, they serve to illustrate various techniques and mechanisms described herein.

Figure 2A:
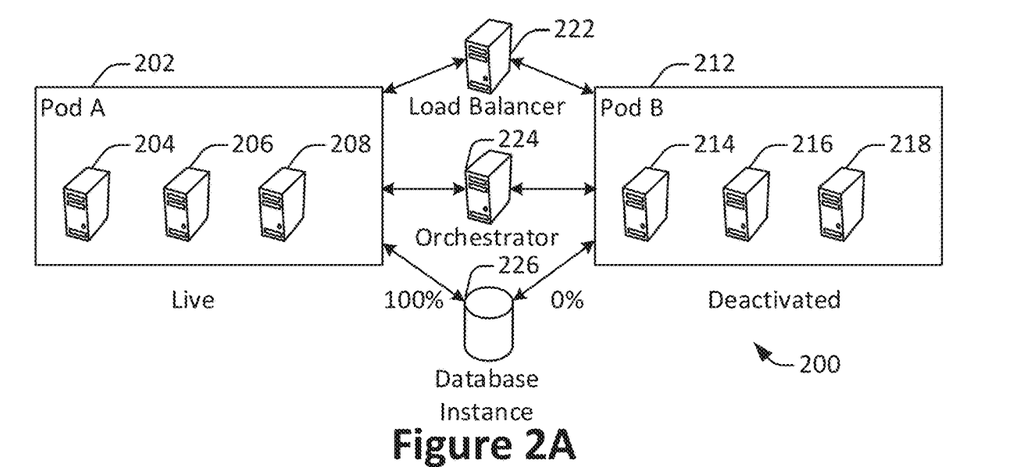
FIG. 2A, FIG. 2B, FIG. 2C, FIG. 3A FIG. 3B, and FIG. 3C illustrate systems configured in accordance with one or more embodiments.

When a system or application server group is in a "Deactivated" state, it is disabled. For example, the pod B 212 is in a "Deactivated" state.

When a system or application server group is in a "Live" state, it is actively receiving and handling request traffic. For instance, in FIG. 2A, the pod A 202 is in a "Live" state.

When a system or application server group is in an "Idle" state, the system or application group is not expected to take request traffic imminently. For instance, in the context of a release, application servers in an application server group are either in the process of starting up or are being kept alive as hot standby in case rollback is required. For example, in FIG. 2B, the pod B 212 is in an "Idle" state because it is in the process of being activated. In such a state, the application server group may be subject to testing to ensure that it is ready to take traffic. As another example, in FIG. 3B, the pod A 202 is in an "Idle" state because it is being kept alive as hot standby in case rollback is required.

When a system or application server group is in a "Warm" state, it is expected to take customer traffic soon. For instance, in FIG. 2C, the pod 212 is in a "Warm" state because it has passed initial testing. In such a state, the request traffic is anticipated to soon be transferred to the Warm system or application server group.

When a system or application server group is in a "Draining" state, it is executing previously received requests but is not taking new request traffic. For instance, in FIG. 3A, the pod 202 is in a "Draining" state because live traffic has been transferred to the pod B 212.

FIGS. 2A-3C illustrate only a few of the many components included in an on-demand computing services system. As discussed throughout the application, and on-demand computing services system may include many components configured to perform a variety of tasks. For example, server pods such as the server pod A 202 may include various numbers of application servers. As another example, the system 200 includes only two server pods. However, an on-demand computing services system may potentially include many such server pods.

Figure 3A:
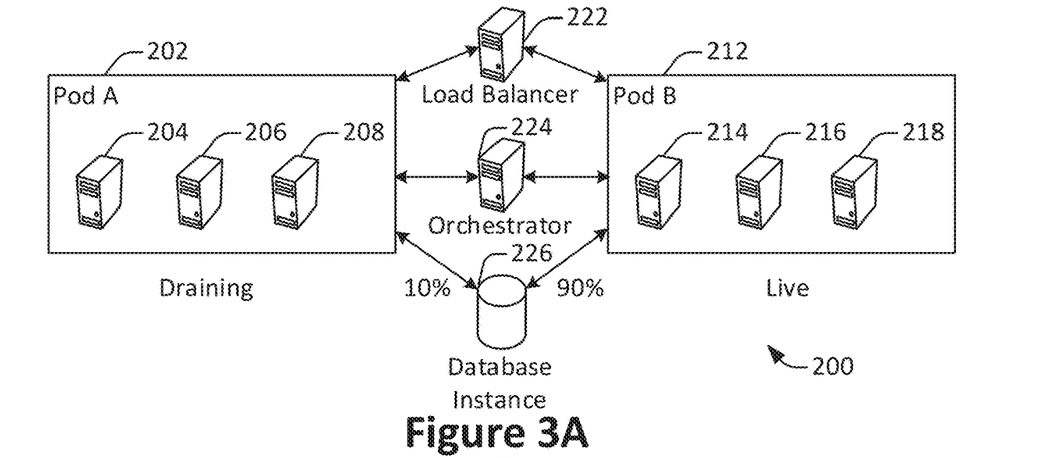
Figure 3B:
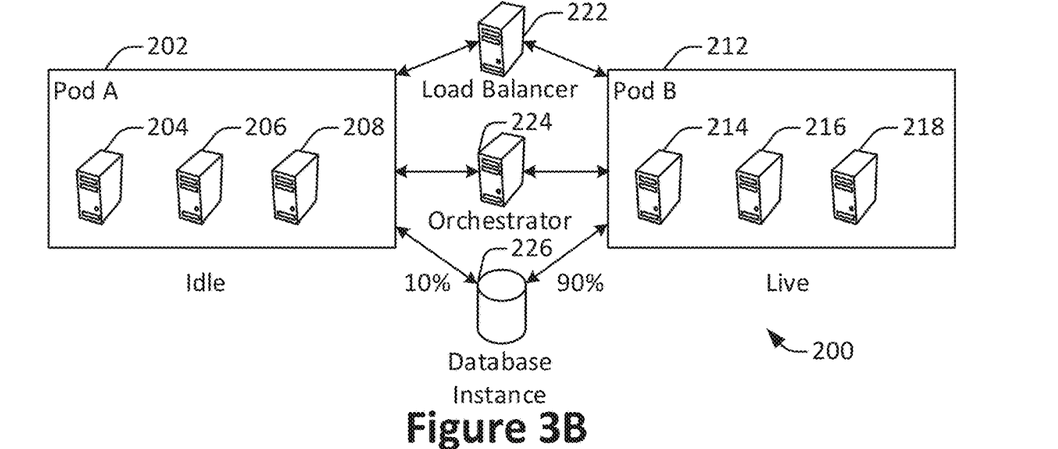
Figure 3C:
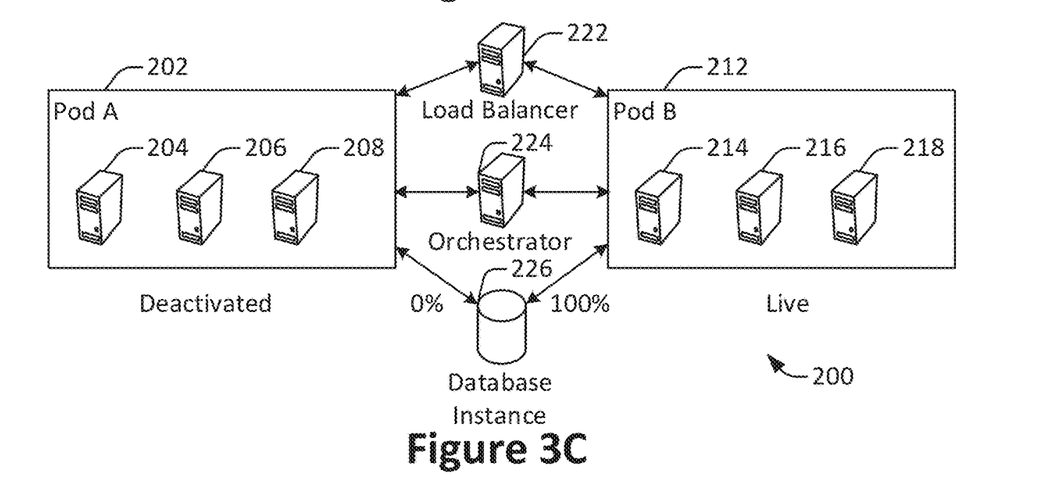
Figure 4:
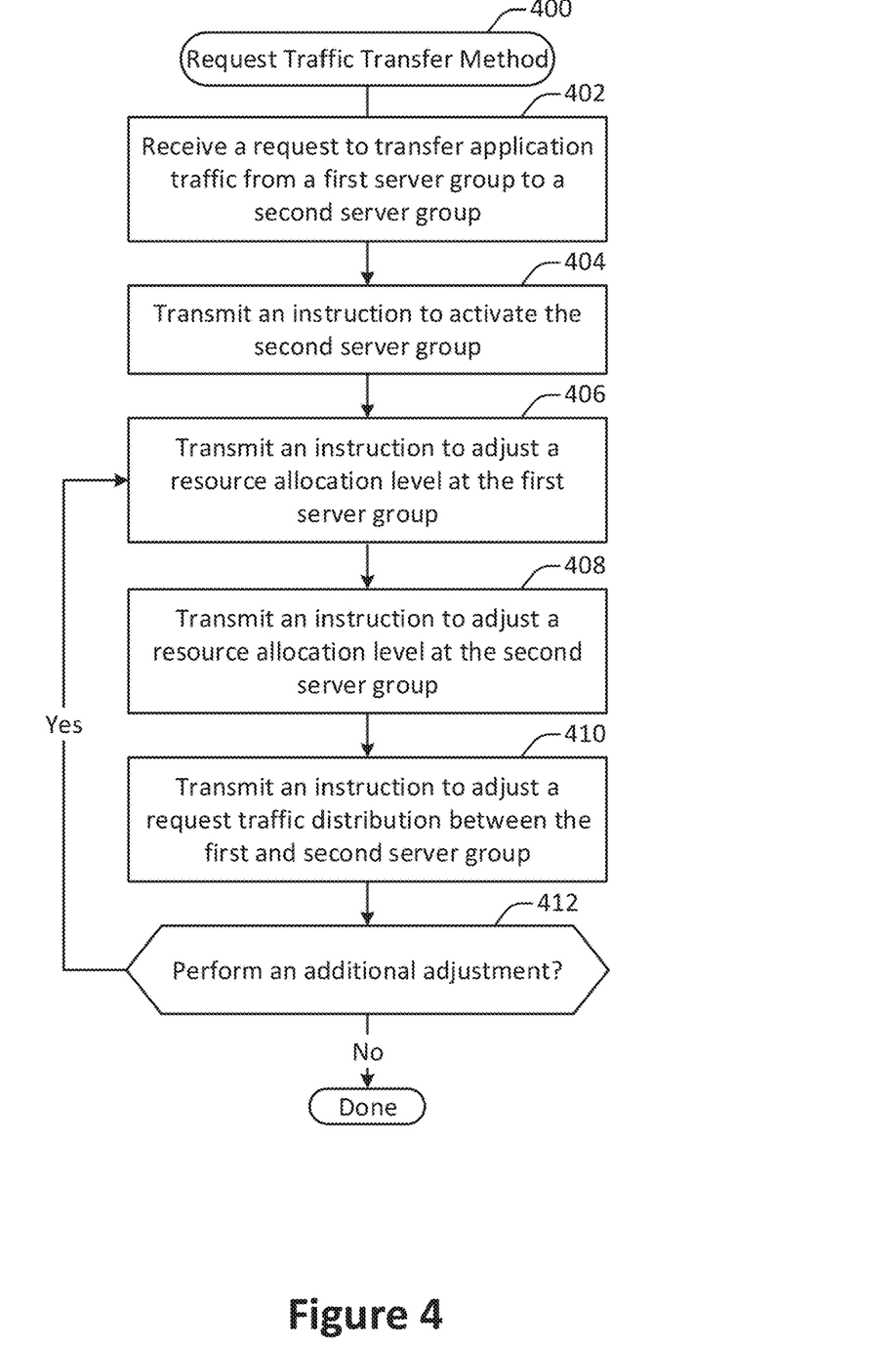
FIG. 4 illustrates an example of a method for transferring request traffic, performed in accordance with one or more embodiments.

FIG. 4 illustrates an example of a method 400 for transferring request traffic, performed in accordance with one or more embodiments. The method 400 may be performed at one or more computing devices within an on-demand computing services environment. For example, the method 400 may be performed at the system 200 shown in FIGS. 2A-3C, and in particular at the orchestrator 224.

A request to transfer some or all application traffic from a first server group to a second server group is received at 402. In some implementations, the request may be received at a systems orchestrator such as the orchestrator 224 shown in FIG. 2.

In particular embodiments, the request may be associated with an upgrade process in which one or more changes are being made to the application execution environment. However, the request may be received in other contexts as well. For example, the request may be received during a process for splitting traffic between the first server group and the second server group. As another example, the request may be received in the context of addressing a hardware failure associated with the first server group.

An instruction to activate the second server group is transmitted at 404. The request may be transmitted to the second server group itself and/or to a controller configured to perform operations such as activating and deactivating various components of the on demand computing services environment.

An instruction to adjust a resource allocation level at the first server group is transmitted at 406. An instruction to adjust a resource allocation level at the second server group is transmitted at 408. An instruction to adjust request traffic distribution between the first and second server group is transmitted at 410, According to various embodiments, the instructions sent at 406-410 may act to transition the server groups between states. Various configuration parameters may be used. For example one configuration parameter governing allocation is the distribution of database connections between the two groups. For instance, the instruction may cause the receiving server group to enter a particular state, such as "Live" or "Deactivated." Either the state itself or the combination of states across the server groups may then lead to an allocation of the shared resource across the two server groups.

Figure 2B:
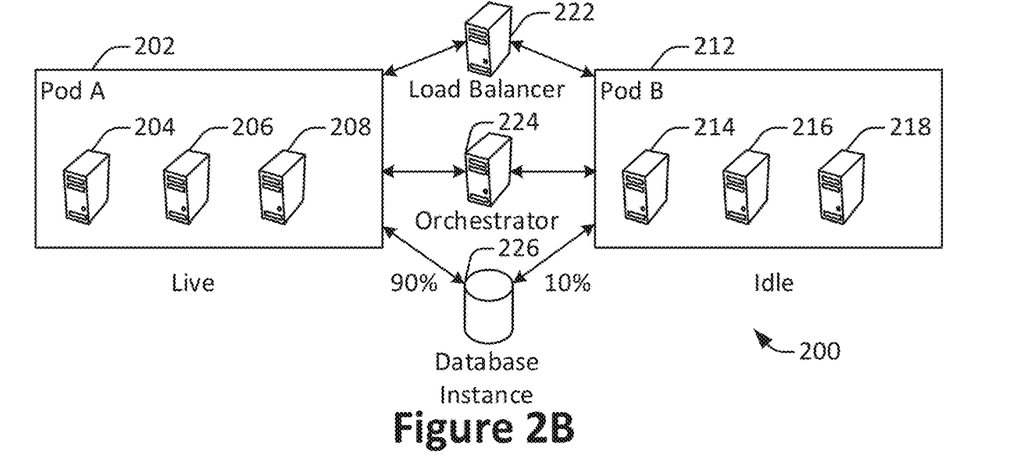
Figure 2C:
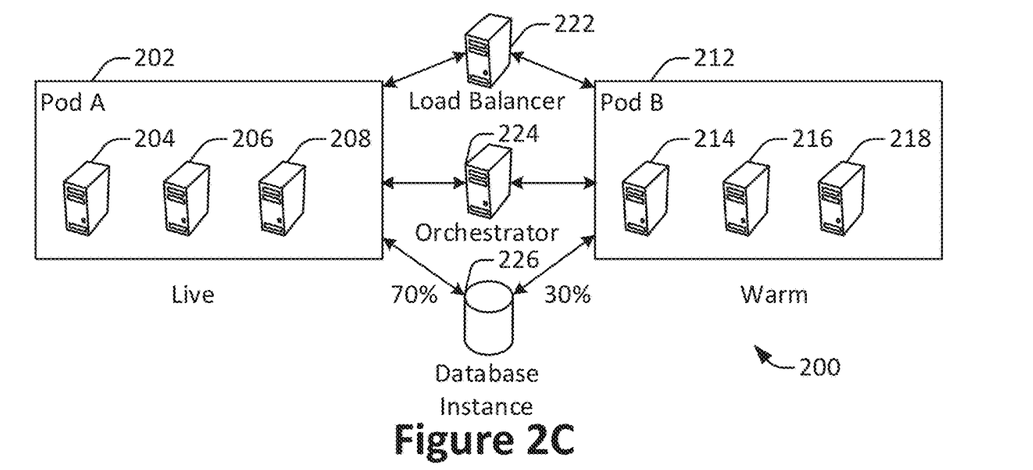

As a concrete example, suppose that the shared resource includes 1,000 connections to the database instance 226 shown in the system 200 in FIG. 2. The states shown in FIGS. 2A-3C represent successive states in a transfer procedure of all traffic from the pod A 202 to the pod B 212. In FIG. 2A, when the pod A 202 is Live and the pod B 212 is Deactivated, 100% of the database connections are allocated to the pod A 202 and 0% of the database connections are allocated to the pod B 212. In FIG. 2B, when the pod A 202 is Live and the pod B 212 is Idle, 90% of the database connections are allocated to the pod A 202 and 10% of the database connections are allocated to the pod B 212. In FIG. 2C, when the pod A 202 is Live and the pod B 212 is Warm, 70% of the database connections are allocated to the pod A 202 and 30% of the database connections are allocated to the pod B 212. In FIG. 3A, when the pod A 202 is Draining and the pod B 212 is Live, 10% of the database connections are allocated to the pod A 202 and 90% of the database connections are allocated to the pod B 212. In FIG. 3B, when the pod A 202 is Idle and the pod B 212 is Live, 10% of the database connections are allocated to the pod A 202 and 90% of the database connections are allocated to the pod B 212. In FIG. 3C, when the pod A 202 is Deactivated and the pod B 212 is Live, 0% of the database connections are allocated to the pod A 202 and 100% of the database connections are allocated to the pod B 212.

Another configuration parameter that may be employed is the speed at which shared resources are altered once an allocation instruction has been generated. For instance, if the shared resource is access to a database system, then the speed at which connections are destroyed at one server group and created at the other server group may be varied. Ramping up too quickly on the second server group risks incidence of connection exhaustion on the first server group, which is still serving a vast majority of customer requests. Conversely, ramping up too slowly on the second server group risks incidence of connection exhaustion on the second server group because connection creation cannot keep pace with the arrival rate of customer requests. As with the resource allocation levels, this speed may be strategically determined based on any of a variety of factors, such as the rate at which new connections can be allocated and the duration of the warm-up phase of the transfer.

A determination is made at 412 as to whether to perform an additional adjustment. In some implementations, each of the server groups may transition through successive phases until a stable point is reached. For example, in FIG. 3C, traffic has been fully transferred from the first server group (i.e. pod A 202) to the second server group (i.e. pod B 212). The determination made at 412 may therefore be made at least in part on whether a transfer process has been completed.

In some embodiments, the determination made at 412 may depend at least in part on whether an error has been detected. For instance, if new software and/or hardware has been deployed on the pod B 212, then the pod B 212 may exhibit problems that only become apparent as traffic is transferred to the pod B 212 at scale. In the event that such problems are detected, then the transfer process may effectively be reversed, for instance by rolling back the transfer of the server group states to return the pod A 202 to the live status.

Importantly, the states and connection proportions shown in FIGS. 2A-3C are only examples of states and connection proportions that may be employed. According to various embodiments, the specific states and connection proportions may be strategically determined based on a variety of factors, such as characteristics of the shared resource and the on-demand computing services environment. For instance, databases provided by Salesforce may behave differently than databases provided by Oracle. Accordingly, the resource allocation may be tuned based on such characteristics. The method 500 shown in FIG. 5 provides an example of an automated tuning procedure.

In particular embodiments, states may be relatively continuous rather than relatively discrete. For example, the proportion of the shared resources allocated to the different server groups may be continuously shifted According to various embodiments, operations shown in FIG. 4 may be performed in an order different than that shown. For example, the operations 406-410 may be performed in parallel or in an order different than that shown.

Figure 5:
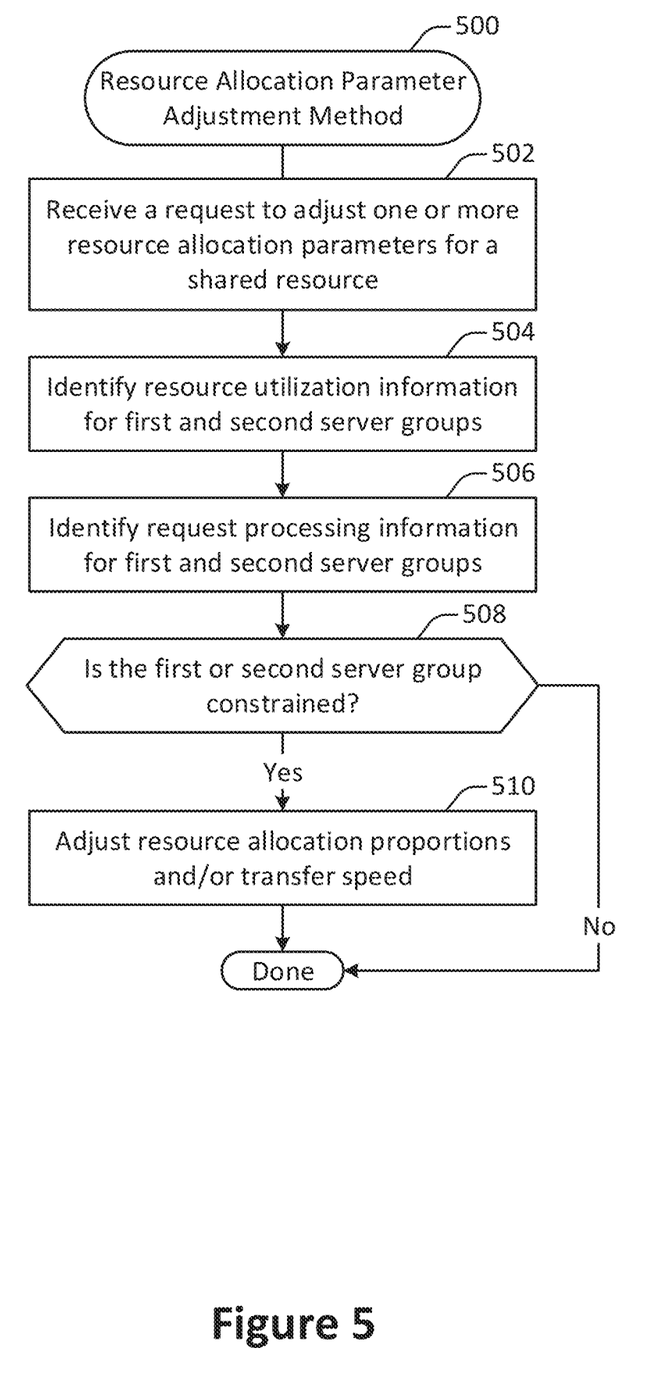
FIG. 5 illustrates an example of a method for adjusting resource allocation parameters, performed in accordance with one or more embodiments.

FIG. 5 illustrates an example of a method 500 for adjusting resource allocation parameters, performed in accordance with one or more embodiments. The method 500 may be used to iteratively adjust parameters such as the allocation of resources between server groups at different phases of a transfer process and/or the speed at which resources are transferred between server groups.

A request to adjust one or more resource allocation parameters for a shared resource is received at 502. In some implementations, the request may be received as part of an automated procedure that is executed after resources are transferred between server groups as discussed with respect to the method 400 shown in FIG. 4.

Resource utilization information for first and second server groups is identified at 504, In some implementations, the resource utilization information may indicate a proportion of resources allocated to each of the first and second server groups that were actively used during resource transfer. For instance, the resource utilization information may indicate a percentage of database connections assigned to each server group that were in active use, over time, during the period when the first server group was draining and the second server group was live.

Request processing information for first and second server groups is identified at 506. In some implementations, the request processing information may indicate a performance level of the first and second server groups during the resource transfer. For instance, the resource utilization information may indicate a percentage of application requests received by each of the first and second server groups that were delayed or dropped during the period in which the first server group was idle and the second server group was live.

According to various embodiments, resource utilization and/or request processing information may be identified by, for instance, accessing server logs or other records associated with previous resource transfers between server groups. In particular embodiments, resource utilization and/or request processing information may be identified for one transfer event or multiple transfer events.

If one or both server group are constrained, then resource allocation proportions and/or transfer speed are adjusted at 510. Adjusting resource allocation proportions may involve, for example, creating or removing transfer groups, adjusting the proportion of the shared resource assigned to the server groups at different phases of the transfer process, or making any other suitable adjustments.

In some configurations, the method 500 may be implemented as a machine learning algorithm that learns the configuration of resource configuration parameters over time that will provide for transfer of traffic between server groups while maintaining a continuous and high level of service. Accordingly, the method 500 may be executed periodically, at scheduled times, or upon request in order to provide for more accurate resource configuration parameter determination.

In particular embodiments, resource allocation may differ across hardware configuration, software configuration, resource type, resource characteristics, time of day, day of the week, or any other of many various characteristics. Accordingly, information about such characteristics may be included in the input data associated with the machine learning algorithm.

The precise distribution is tunable and can vary depending on the environment since, for example, Salesforce and Oracle databases behave differently. However, allocating resources based on transfer intent and grouping hosts by phases provides the flexibility to tune resource allocation to maintain a high level of service even during traffic transfer and resource reallocation events.

Figure 6:
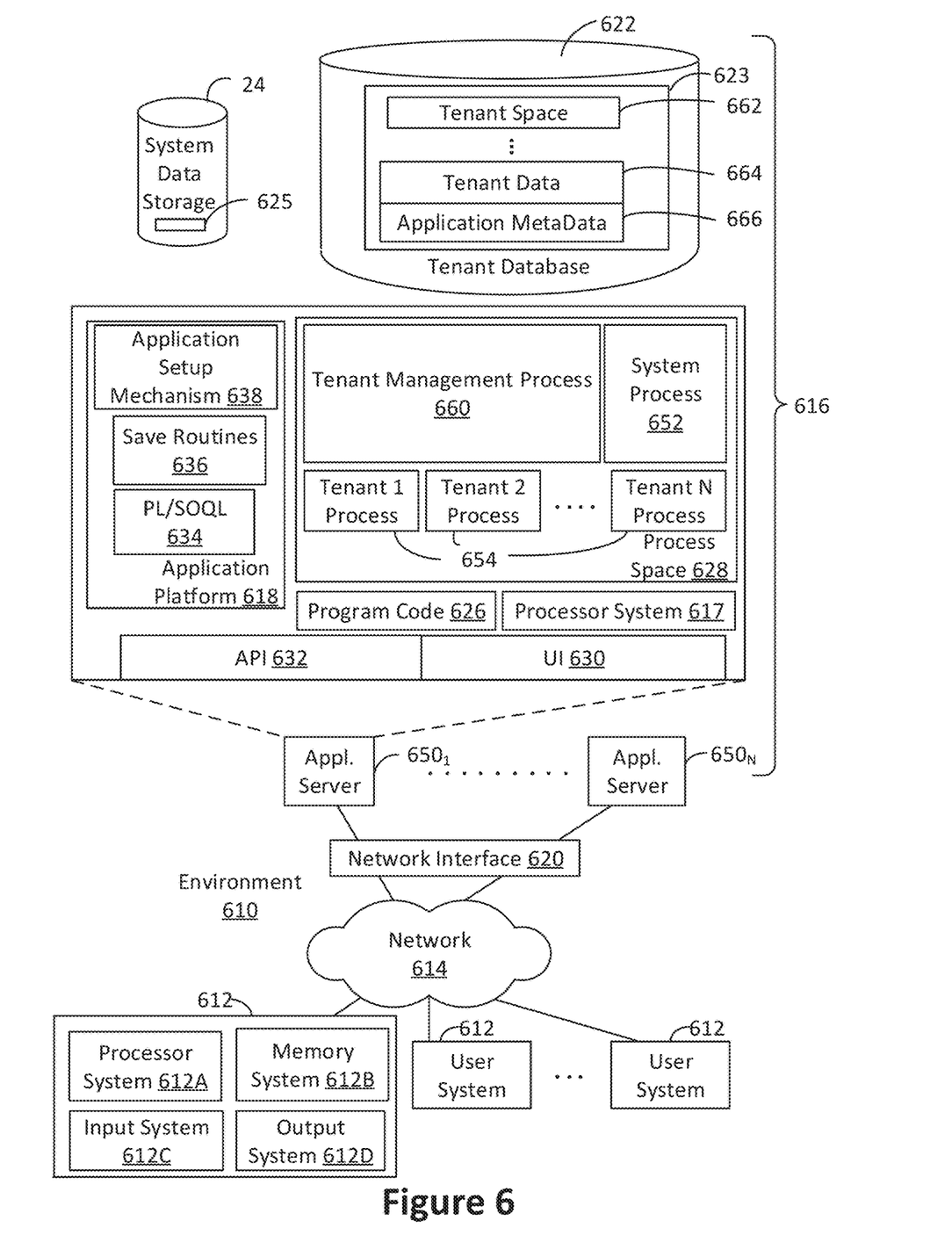
FIG. 6 shows a block diagram of an example of an environment 610 that includes an on-demand database service configured in accordance with some implementations.

FIG. 6 shows a block diagram of an example of an environment 610 that includes an on-demand database service configured in accordance with some implementations. Environment 610 may include user systems 612, network 614, database system 616, processor system 617 application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666, Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases collections of distributed databases, or any other suitable database system. A database image may include one or more database objects. A relational database management system (RDBMS) or a similar system may execute storage and retrieval of information against these objects.

In some implementations, the application platform 618 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based on-demand computing services environment system. For example, in some implementations, system 616 may include application servers configured to implement and execute a variety of software applications. The application servers may be configured to provide related data, code, forms, web pages and other information to and from user systems 612. Additionally, the application servers may be configured to store information to, and retrieve information from a database system. Such information may include related data, objects, and/or Webpage content. With a mufti-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MIS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 7A:
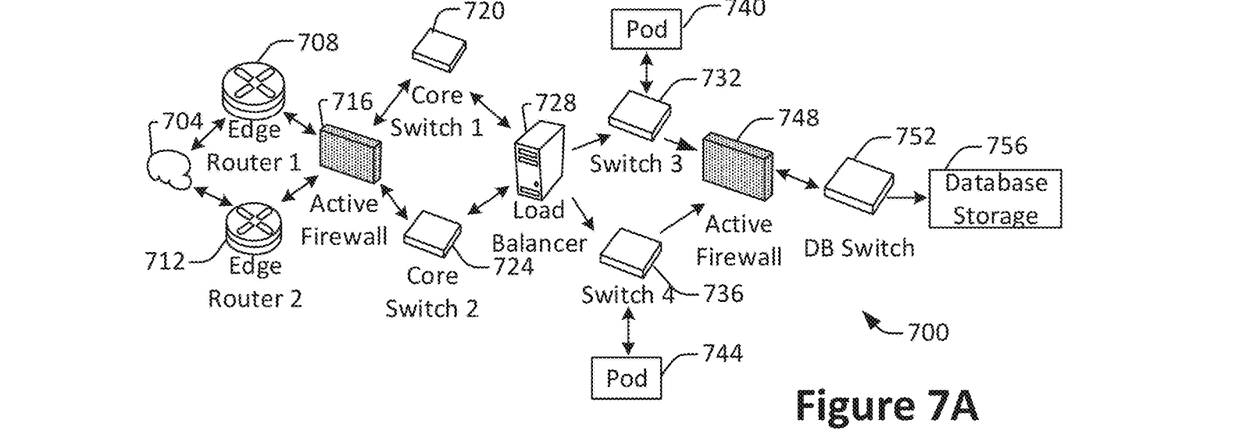
FIG. 7A shows a system diagram of an example of architectural components of an on-demand database service environment 700, configured in accordance with some implementations.

FIG. 7A shows a system diagram of an example of architectural components of an on-demand database service environment 700, configured in accordance with some implementations. A client machine located in the cloud 704 may communicate with the on-demand database service environment via one or more edge routers 708 and 712. A client machine may include any of the examples of user systems ?12 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process constrained resource allocation information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

Figure 7B:
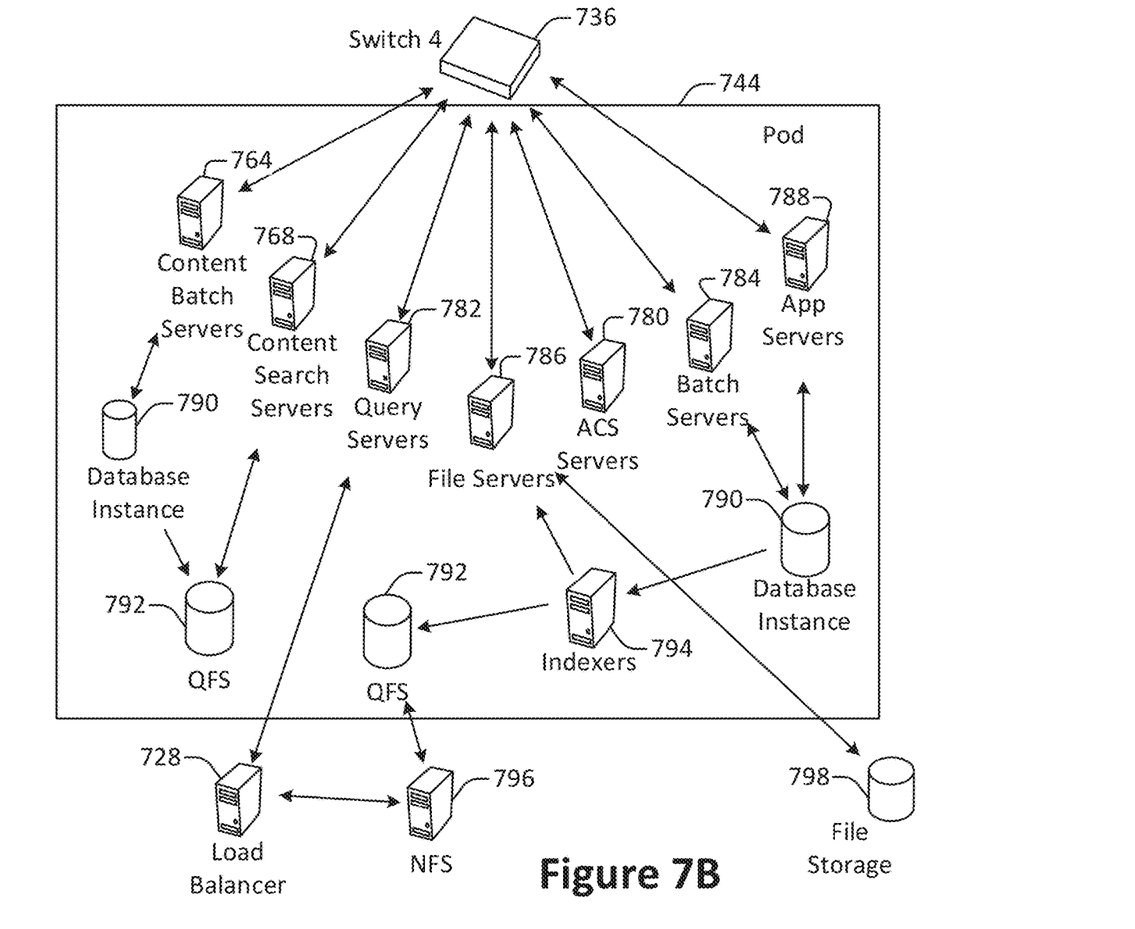
FIG. 7B shows a system diagram further illustrating an example of architectural components of an on-demand database service environment, in accordance with some implementations.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780 batch servers 784 and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MIS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744, The ACS servers 780 may control access to data, hardware resources, or software resources called upon to render services provided by the pod 744. The batch servers 784 may process batch jobs which are used to run tasks at specified times. Thus, the batch servers 784 may transmit instructions to other servers such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 8:
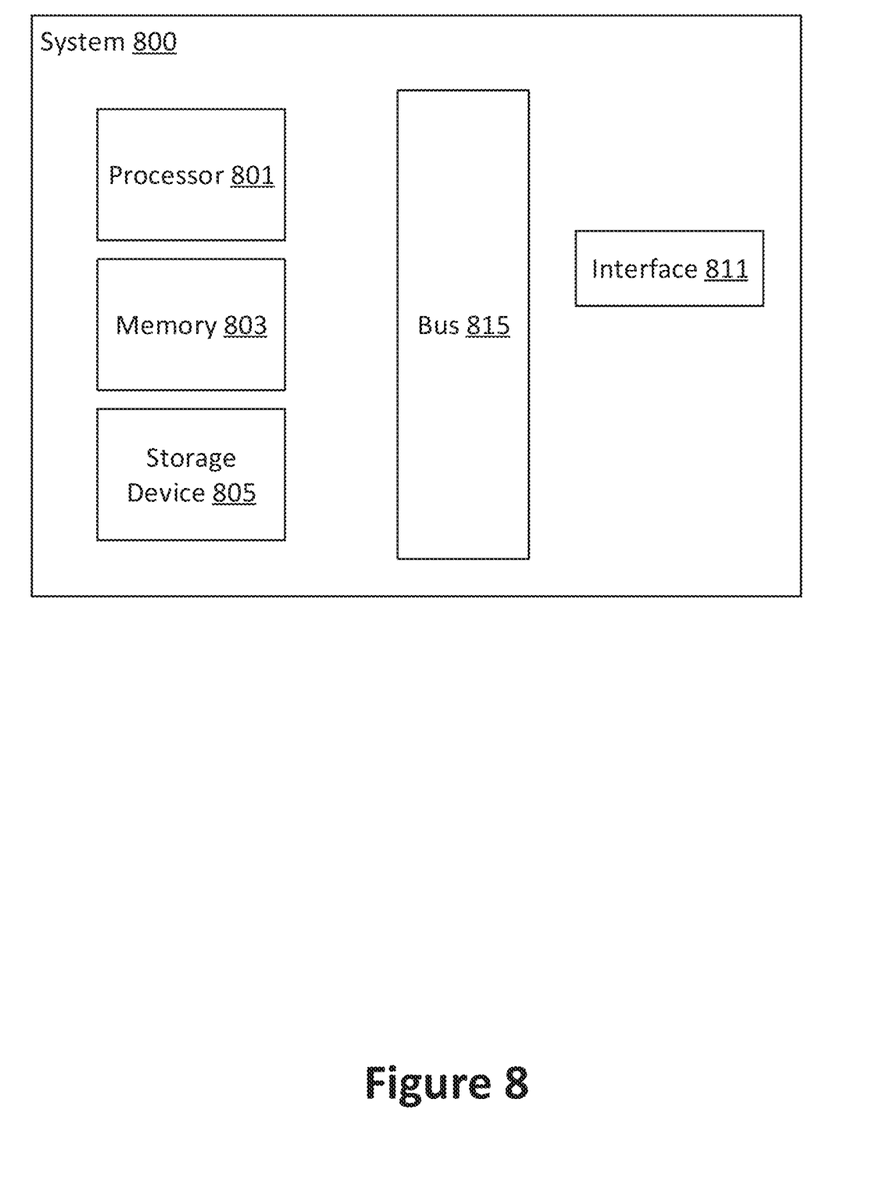
FIG. 8 illustrates one example of a computing device, configured in accordance with one or more embodiments.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
transmitting a first message to a first server group in an on-demand computing services environment via a network interface, the first message instructing the first server group to reduce a first resource allocation level associated with a network-accessible computing resource, the first resource allocation level designating a first proportion of the network-accessible computing resource shared among the first server group;
transmitting a second message to a second server group in the on-demand computing services environment via the network interface, the second message instructing the second server group to increase a second resource allocation level associated with the network-accessible computing resource, the first resource allocation level designating a second proportion of the network-accessible computing resource shared among the second server group; and
transferring request traffic from the first server group to the second server group after decreasing the first resource allocation level and increasing the second resource allocation level, the request traffic being associated with providing services via the on-demand computing services environment.

2. The method recited in claim 1, wherein the network-accessible computing resource is a database connection pool associated with a shared database system.

3. The method recited in claim 2, wherein the database connection pool includes a plurality of database connections, and wherein each of the plurality of database connections facilitates execution of database queries by the shared database system.

4. The method recited in claim 3, wherein the first resource allocation level identifies a designated number of the plurality of database connections that are shared among the first server group.

5. The method recited in claim 2, wherein the shared database system is a multitenant database system that stores data associated with a plurality of organizations that access computing services via the on-demand computing services environment.

6. The method recited in claim 1, wherein the network-accessible computing resource is a message queue broker pool.

7. The method recited in claim 1, the method further comprising:
when it is determined that all request traffic has been transferred from the first server group to the second server group, transmitting a third message to the first server group, the third message instructing the first server group to further reduce the first resource allocation level.

8. The method recited in claim 7,
when it is determined that all request traffic has been transferred from the first server group to the second server group, transmitting a fourth message to the second server group, the fourth message instructing the second server group to further reduce the second resource allocation level.

9. The method recited in claim 8, wherein the first and second messages are associated with a transition of the first and second server groups to a first resource allocation phase, and wherein the third and fourth messages are associated with a transition of the first and second server groups to a second resource allocation phase.

10. The method recited in claim 9, wherein the third message instructs the first server group to enter an idle status in which the first server group is not processing request traffic.

11. The method recited in claim 1, wherein the first message instructs the first server group to enter a draining status in which the first server group processes request traffic that it has already received but does not process newly received request traffic.

12. The method recited in claim 1, wherein the second message instructs the second server group to enter a warming status in which the second server group prepares to receive request traffic.

13. The method recited in claim 1, wherein the first resource allocation level is reduced by a first amount specified by a machine learning model, and wherein the second resource allocation level is increased by a second amount specified by the machine learning model.

14. A system configured to provide an on-demand computing services environment, the system comprising:
a first server group configured to receive a first message instructing the first server group to reduce a first resource allocation level associated with a network-accessible computing resource, the first resource allocation level designating a first proportion of the network-accessible computing resource shared among the first server group;

a second server group configured to receive a second message instructing the second server group to increase a second resource allocation level associated with the network-accessible computing resource, the first resource allocation level designating a second proportion of the network-accessible computing resource shared among the second server group; and a request server configured to transfer request traffic from the first server group to the second server group after decreasing the first resource allocation level and increasing the second resource allocation level, the request traffic being associated with providing services via the on-demand computing services environment.

15. The system recited in claim 14, wherein the network-accessible computing resource is a database connection pool associated with a shared database system.

16. The system recited in claim 15, wherein the database connection pool includes a plurality of database connections, and wherein each of the plurality of database connections facilitates execution of database queries by the shared database system.

17. The system recited in claim 16, wherein the first resource allocation level identifies a designated number of the plurality of database connections that are shared among the first server group.

18. The system recited in claim 15, wherein the shared database system is a multitenant database system that stores data associated with a plurality of organizations that access computing services via the on-demand computing services environment.

19. One or more machine-readable media configured to perform a method, the method comprising:

transmitting a first message to a first server group in an on-demand computing services environment via a network interface, the first message instructing the first server group to reduce a first resource allocation level associated with a network-accessible computing resource, the first resource allocation level designating a first proportion of the network-accessible computing resource shared among the first server group;

transmitting a second message to a second server group in the on-demand computing services environment via the network interface, the second message instructing the second server group to increase a second resource allocation level associated with the network-accessible computing resource, the first resource allocation level designating a second proportion of the network-accessible computing resource shared among the second server group; and transferring request traffic from the first server group to the second server group after decreasing the first resource allocation level and increasing the second resource allocation level, the request traffic being associated with providing services via the on-demand computing services environment.

20. The one or more machine-readable media recited in claim 19, wherein the network-accessible computing resource is a database connection pool associated with a shared database system, wherein the database connection pool includes a plurality of database connections, wherein each of the plurality of database connections facilitates execution of database queries by the shared database system, and wherein the first resource allocation level identifies a designated number of the plurality of database connections that are shared among the first server group.

\* \* \* \* \*